No. 701,646. Patented June 3, 1902.
C. A. THOMSON.
DOUGH MOLDING MACHINE.
(Application filed Apr. 17, 1901.)
(No Model.) 4 Sheets—Sheet 1.
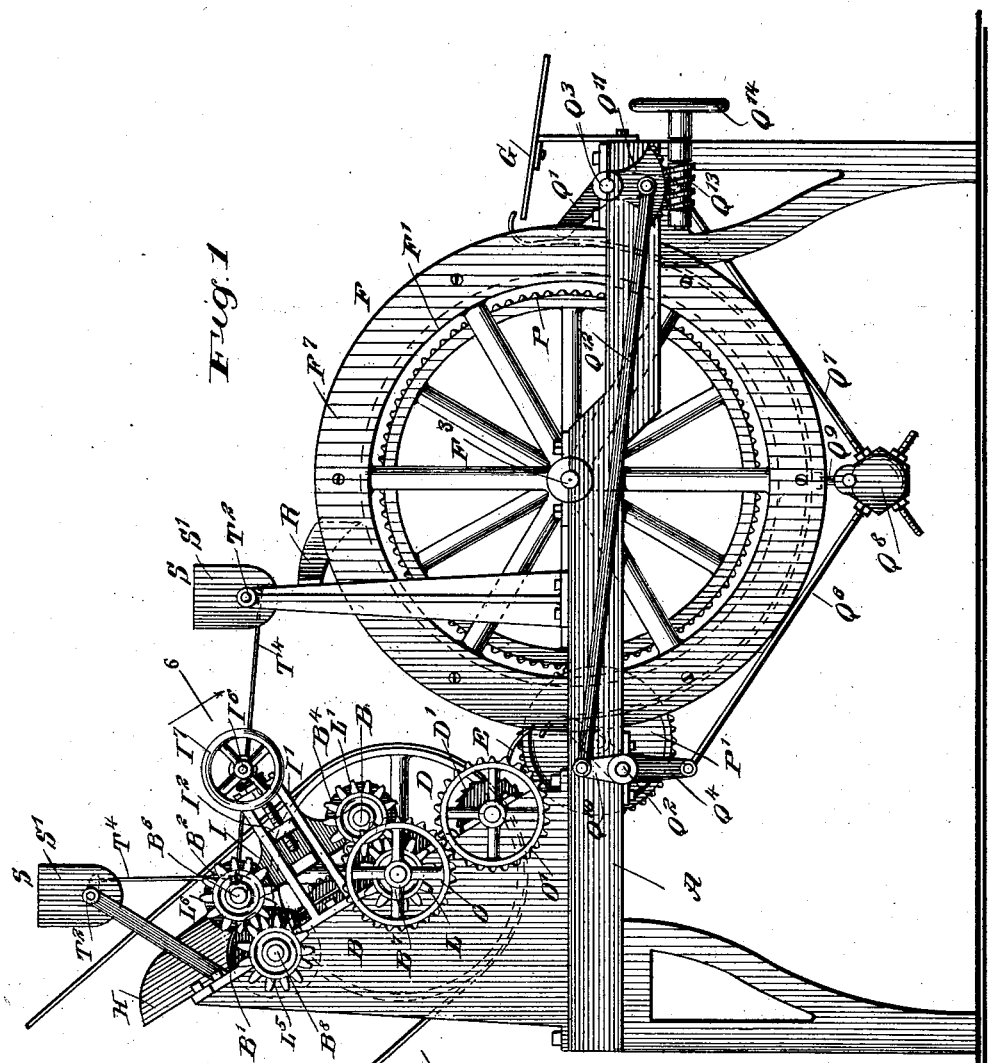
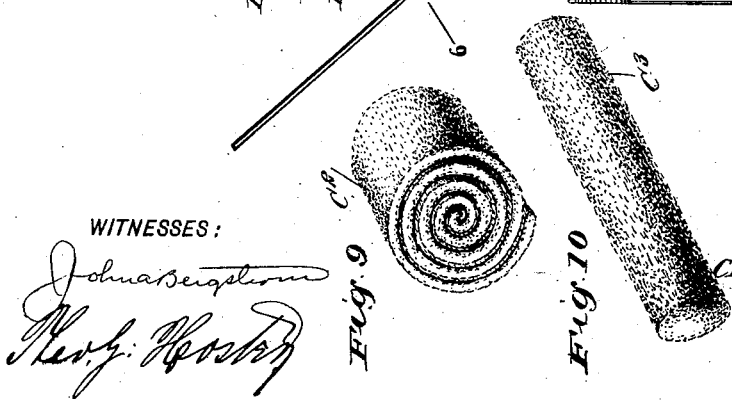
WITNESSES:
INVENTOR
Charles A. Thomson.
BY
ATTORNEYS No. 701,646. Patented June 3, 1902.
C. A. THOMSON.
DOUGH MOLDING MACHINE.
(Application filed Apr. 17, 1901.)
(No Model.) 4 Sheets—Sheet 2.
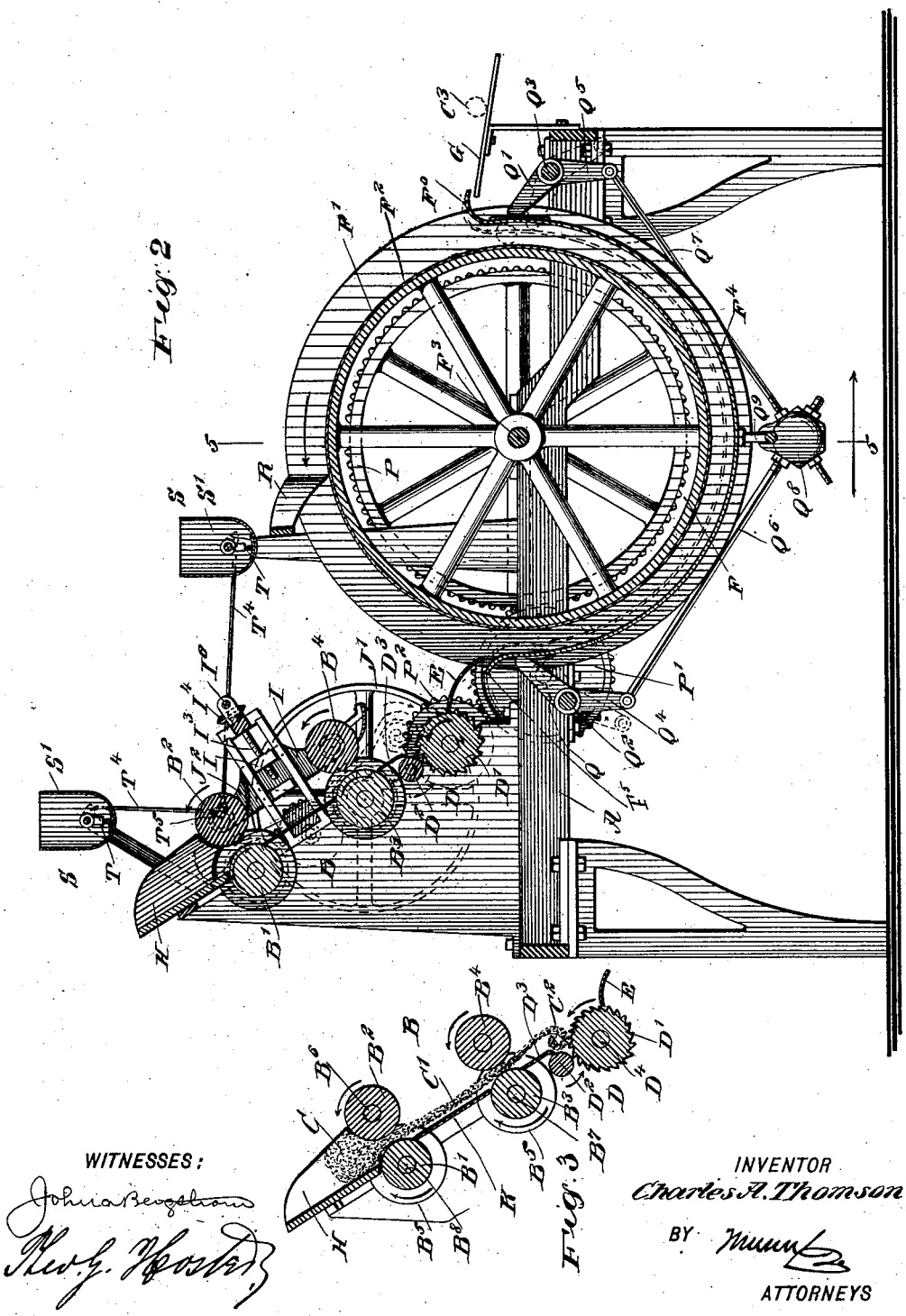
WITNESSES:
INVENTOR
Charles A. Thomson.
BY
ATTORNEYS

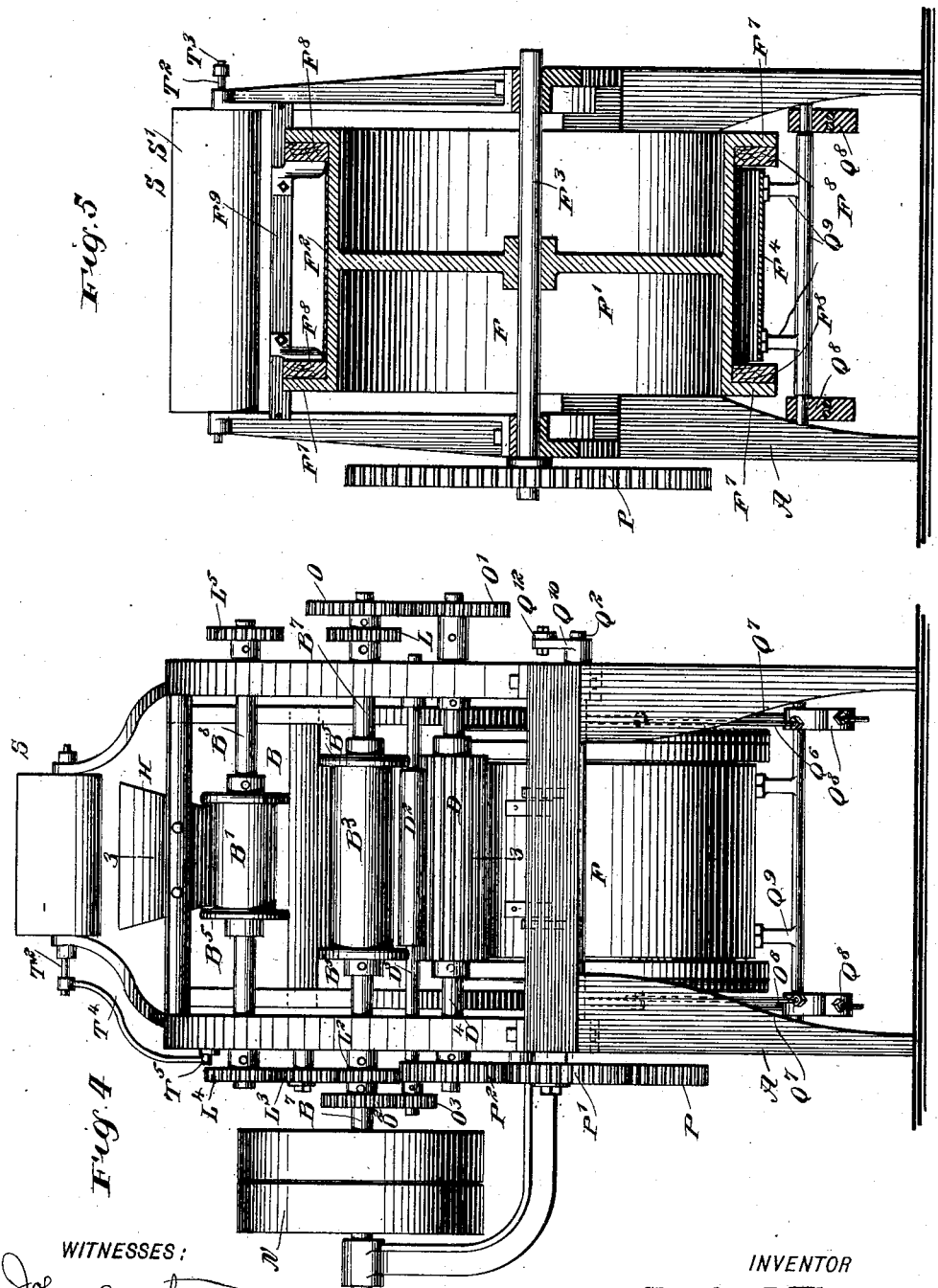

No. 701,646. Patented June 3, 1902.
C. A. THOMSON.
DOUGH MOLDING MACHINE.
(Application filed Apr. 17, 1901.)
(No Model.) 4 Sheets—Sheet 4.
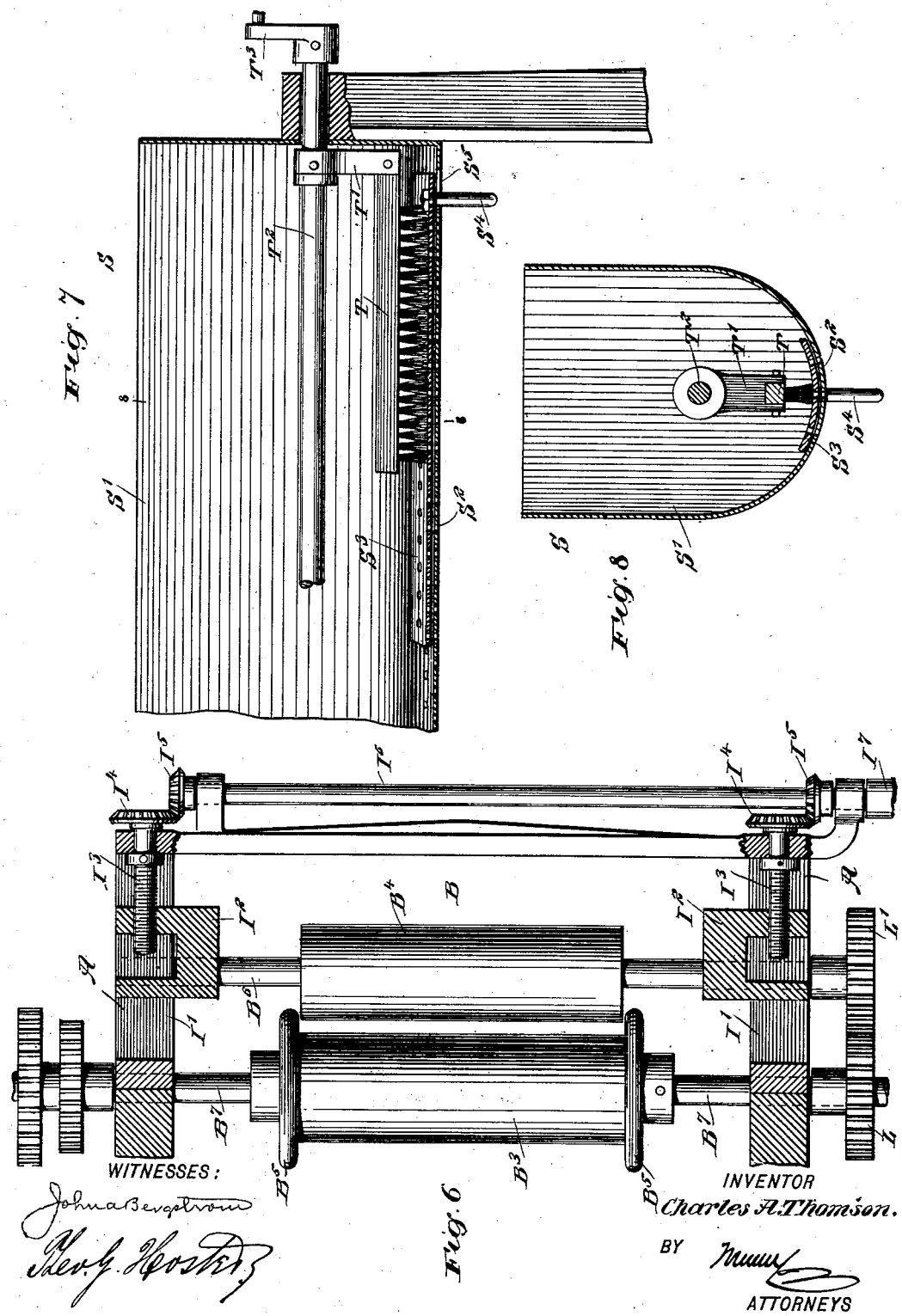

UNITED STATES PATENT OFFICE.

CHARLES A. THOMSON, OF BELLEVILLE, NEW JERSEY.

DOUGH-MOLDING MACHINE.

SPECIFICATION forming part of Letters Patent No. 701,646, dated June 3, 1902.

Application filed April 17, 1901. Serial No. 56,239. (No model.)

*To all whom it may concern:*

Be it known that I, CHARLES A. THOMSON, a subject of the King of Great Britain, and a resident of Belleville, in the county of Essex and State of New Jersey, have invented certain new and useful Improvements in Dough-Molding Machines, of which the following is a full, clear, and exact description.

The object of the invention is to provide a new and improved dough-molding machine which is simple and durable in construction, very effective in operation, and more especially designed for forming a lump of dough into a sheet, which is subsequently rolled up into a spiral roll and subjected to a rolling and squeezing pressure to knead or work the dough into proper condition for the pan in which the dough is to be baked into bread of a very high quality.

The invention consists of novel features and parts and combinations of the same, as will be fully described hereinafter and then pointed out in the claims.

Reference is to be had to the accompanying drawings, forming a part of this specification, in which similar characters of reference indicate corresponding parts in all the views.

Figure 1 is a side elevation of the improvement. Fig. 2 is a sectional side elevation of the same. Fig. 3 is a sectional side elevation of the dough-sheet and spiral-roll-forming device, the section being on the line 3 3 in Fig. 4. Fig. 4 is a front end elevation of the improvement. Fig. 5 is a cross-section of the same on the line 5 5 in Fig. 2. Fig. 6 is an enlarged sectional plan view of the sheet-forming device, the section being on the line 6 6 in Fig. 1. Fig. 7 is an enlarged cross-section of one of the flour-sprinklers. Fig. 8 is a sectional side elevation of the same on the line 8 8 in Fig. 7. Fig. 9 is a perspective view of the dough formed into a spiral roll, and Fig. 10 is a like view of the dough formed into shape for insertion into the baking-pan.

The preliminary steps for forming dough are carried out in the usual manner, and after the dough has risen and been rolled and divided into parts or lumps of the desired weight then such measured dough parts or lumps are successively placed in the machine, and the latter then automatically forms the dough first into a sheet, rolls the same up into spiral form, and works the spiral roll into a longitudinal roll ready for insertion in the pan to be put into the oven for baking purposes. During this treatment of the dough in the machine a thorough kneading or working is obtained to insure the production of bread of a very high quality.

The improved dough-molding machine is mounted on a suitably-constructed frame A, carrying a device B for forming a lump of dough C into a sheet of dough C' and automatically discharging this sheet C' upon a rolling-up device D to form the sheet into a spiral roll $C^2$, and this roll $C^2$ then passes over a guide-plate E into a pressing and rolling device F, which forms the spiral roll $C^2$ into a roll $C^3$, discharged over a discharge-chute G, then put into a pan in which the dough is subjected to heat in an oven to form bread. The lump of dough C is placed in a suitably-constructed hopper H, which opens at its lower end upon a pair of rollers B' $B^2$, between which the dough is pressed into a sheet to be then subsequently pressed into a thinner and lighter sheet by a second set of rollers $B^3$ $B^4$, similar to the set of rollers B' $B^2$, only located a distance below said rollers B' $B^2$, as is plainly shown in the drawings.

The rollers B' $B^3$ are journaled in stationary bearings carried on the main frame A, and each of said rollers B' $B^3$ is provided with annular flanges $B^5$, between which extend the corresponding rollers $B^2$ $B^4$, (see Fig. 6,) so that a passage is formed between each set of rollers for the dough to pass through and be pressed into sheet form. The passage between the rollers $B^3$ $B^4$ is somewhat longer and narrower than the passage between the rollers B' $B^2$ to press the dough into a very thin sheet and roll the dough into spiral form, as before mentioned. The rollers $B^2$ $B^4$ are journaled in bearings carried by a frame I, adjustably held in stationary guideways I', secured on the main frame A, said frame I having for this purpose offsets $I^2$, extending in the guideway I', as shown in Figs. 2 and 6. The offsets $I^2$ are engaged by screw-rods $I^3$, journaled in the guideways I', and on the outer ends of said screw-rods $I^3$ are secured bevel gear-wheels $I^4$ in mesh with bevel-pinions $I^5$, secured on a transverse shaft $I^6$, journaled in suitable bearings on the guideway I'. On one outer end of the shaft I$^6$ is a crank-arm or hand-wheel I$^7$, adapted to be taken hold of by the operator to turn the shaft I$^6$, and thereby cause a simultaneous revolving of the screw-rods I$^3$ to move the frame I inward or outward in the guideways I', according to the direction in which the hand-wheel I$^7$ is turned by the operator. By this arrangement the width of the passage between the sets of rollers B' B$^2$ and B$^3$ B$^4$ can be increased or diminished, as desired, to form the dough into a sheet of greater or less thickness.

On the frame I are secured scrapers J, extending in contact with the peripheral surfaces of the rollers B$^2$ B$^4$, so as to scrape any dough that may adhere on said surfaces from the same.

In order to guide the dough sheet C' from the sets of rollers B' B$^2$ to the rollers B$^3$ B$^4$, I provide a suitable table K, supported on the main frame and extending from the peripheral surface of the roller B' to that of the roller B$^3$, as is plainly shown in Fig. 3. The several rollers B' B$^2$ B$^3$ B$^4$ rotate in unison with each other, and in order to accomplish this result the shaft B$^7$ for the roller B$^3$ is made the main driving-shaft and carries a gear-wheel L in mesh with a gear-wheel L', secured on the shaft B$^6$ for the roller B$^4$. On the shaft B$^7$ is also secured a gear-wheel L$^2$ (see Fig. 4) in mesh with an intermediate gear-wheel L$^3$, mounted on a stud carried by the frame A, the gear-wheel L$^3$ meshing with a gear-wheel L$^4$, secured on the shaft B$^8$ of the roller B'. This shaft B$^8$ carries a gear-wheel L$^5$ (see Figs. 4 and 1) in mesh with a gear-wheel L$^6$, secured on the shaft B$^6$ of the roller B$^2$. The shaft B$^7$ also carries fast and loose pulleys N, connected by belt with other machinery to impart a rotary motion to the shaft B$^7$, which by the gear-wheels mentioned imparts a rotary motion to the several rollers B' B$^2$ B$^3$ B$^4$ to produce the desired result previously stated.

The rolling-up device D consists, essentially of a large toothed roller D', a small smooth roller D$^2$, and an apron or table D$^3$, extending from the peripheral surface of the roller B$^3$ to the top of the roller D$^2$, so that the sheet of dough C' as it leaves the rollers B$^3$ B$^4$ passes over said table against one side of the toothed roller D', so that the latter turns up the sheet of dough in an inward direction, as is plainly indicated in Fig. 3, against the smooth roller D$^2$, which in turn causes the turned-over sheet portion to roll upon itself, and as this process is repeated the sheet of dough is formed into a spiral roll, as indicated in Fig. 9, the roll resting on the table D$^3$ until the last portion of the dough has left the rollers B$^3$ B$^4$, and then the roll rolls over by its own weight over the peripheral surface of the roller D' and over the apron or chute E into the rolling and pressing device F, as previously described. In order to impart the necessary rotary motion to the rollers D' D$^2$, (see arrows, Fig. 3,) I provide the shaft B$^7$ with a gear-wheel O in mesh with a gear-wheel O' on the shaft D$^4$ of the toothed roller D'. A gear-wheel O$^2$ is also secured on the shaft B$^7$ and is in mesh with a gear-wheel O$^3$, secured on a shaft D$^5$ of the smooth roller D$^2$. (See Fig. 4.) When the shaft B$^7$ is rotated, the rollers D' D$^2$ are rotated in unison with the sets of rollers B' B$^2$ and B$^3$ B$^4$.

The rolling and pressing device F consists, essentially, of a drum F', having a peripheral covering F$^2$ of felt, cloth, or similar material, and said drum F' is secured on a shaft F$^3$, journaled in suitable bearings on the main frame A. On the shaft F$^3$ is secured a gear-wheel P in mesh with an intermediate gear-wheel P', journaled on the main frame, and in mesh with a gear-wheel P$^2$, secured on the shaft D$^4$ of the toothed roller D'. Thus when the latter is rotated a rotary motion is given to the drum F' by the gear-wheels P$^2$ P' P.

Around the lower half portion of the drum F' and spaced therefrom is arranged a shield F$^4$, preferably of sheet metal and formed at its ends with outwardly-curved flanges F$^5$ F$^6$, of which the flange F$^5$ extends under the apron or chute E and the flange F$^6$ extends over the discharge apron or chute G. By the arrangement described the spiral roll C$^2$, traveling over the apron or chute E$^4$, drops into the space formed between the shield F and the covering F$^2$ of the drum F', and as the latter rotates the spiral roll of dough it is subjected to a pressing and rolling action to thoroughly work and knead the dough, the roll of dough rolling off on the stationary shield F$^4$. The distance between the shield F$^4$ and the covering F$^2$ is somewhat less than the diameter of the spiral roll, so that the dough is squeezed, pressed, and rolled during its passage in the pressing and rolling device F until finally the thoroughly-worked dough is discharged over the flange F$^6$ upon the chute G to then drop into or be placed by the operator into the pan in which the bread is to be finally baked in an oven. The shield F$^4$ is adjustable relatively to the peripheral surface of the drum F', and for this purpose the following device is provided: The shield F$^4$ near its flanges F$^5$ F$^6$ is engaged by levers Q Q', secured on shafts Q$^2$ Q$^3$, respectively, journaled in suitable bearings in the main frame A. The shafts Q$^2$ Q$^3$ carry downwardly-extending arms Q$^4$ Q$^5$, pivotally connected by rods Q$^6$ Q$^7$ with a support Q$^8$, carrying arms Q$^9$, attached to the shield F$^4$, at the bottom thereof, as is plainly illustrated in Figs. 2 and 5. The shafts Q$^2$ Q$^3$ are also provided with arms Q$^{10}$ Q$^{11}$, connected with each other by a link Q$^{12}$, the arm Q$^{11}$ being formed with a segmental worm-wheel in mesh with a worm Q$^{13}$, journaled in suitable bearings in the main frame and having a hand-wheel Q$^{14}$ under the control of the operator. When the operator turns the hand-wheel Q$^{14}$, the worm Q$^{13}$ imparts a swinging motion to the arm Q$^{11}$, and as the latter is pivotally connected by the link $Q^{12}$ with the arm $Q^{10}$ it is evident that a simultaneous rocking motion is given to the shafts $Q^2$ $Q^3$. The rocking motion given to the shafts causes the levers $Q$ $Q'$ to press against the ends of the shield $F^4$ and move the same inward to decrease the space between the shield and the peripheral surface of the drum $F'$. At the same time the lower portion of the shield $F^4$ is moved inward by the action of the arms $Q^4$ $Q^5$ and the links $Q^6$ $Q^7$, carrying the support $Q^8$, rigidly connected by arms $Q^9$ with said shield $F^4$. Thus by the arrangement described the shield is acted upon at three different points to move the same uniformly inward, and thereby decrease the space through which the spiral roll has to pass, as above explained. By turning the hand-wheel $Q^{14}$ in an opposite direction the space between the shield $F^4$ and the peripheral surface of the drum will be increased, owing to the outward movement of the shield by its own resiliency and the outward movement of the levers $Q$ $Q'$ and the arms $Q^9$.

In order to keep the peripheral surface of the drum $F'$ as clean as possible, I provide a suitable scraper $R$, engaging the covering $F^2$ near the top thereof, as indicated in Figs. 1 and 2.

In order to permit the use of the drum $F'$ for rolls of less length, I provide auxiliary flanges $F^8$, adapted to rest against the inside of the flanges $F^7$ of the drum $F'$, as indicated in Fig. 5, said auxiliary flanges $F^8$ being secured to a suitable cross-bar $F^9$, carried by the main frame $A$. By this arrangement auxiliary flanges $F^8$ of greater or less thickness may be inserted to accommodate rolls of greater or less length.

In order to prevent the dough from adhering to the rollers $B'$ $B^2$ and the peripheral surface of the drum $F'$, I provide suitable flour-sprinklers $S$, alike in construction and supported on the main frame $A$ above the rollers $B'$ $B^2$ and the drum $F'$, as is plainly shown in Figs. 1 and 2. Each of the sprinklers $S$ is provided with a casing $S'$, having a semicircular bottom $S^2$, provided with perforations, over which works a perforated slide $S^3$ under the control of the operator to bring the perforations of the slide in or out of register with the perforations in the bottom $S^2$. For this purpose the slide $S^3$ is provided with a handle $S^4$, extending through an elongated slot $S^5$ in the bottom $S^2$, (see Fig. 7,) the said handle $S^4$ being adapted to be taken hold of by the operator to shift the slide transversely in the casing $S'$. Over the slide $S^3$ operates a brush $T$ for brushing a certain quantity of flour contained in the casing $S'$ through the registering perforations in the slide and bottom, the flour thus discharged dropping down upon the roller $B^2$ and the drum $F'$. The brush $T$ is mounted to oscillate and for this purpose has arms $T'$, secured to a shaft $T^2$, journaled in suitable bearings and provided at one outer end with a crank-arm $T^3$, connected by a link $T^4$ with a crank-arm $T^5$, secured on the shaft $B^6$ of the roller $B^2$, as indicated in Fig. 2. When the roller $B^2$ is rotated, the crank-arm $T^5$ imparts a rocking motion to the shaft $T^2$ by the action described, so that the brush $T$ oscillates over the slide $S^3$ for the purpose mentioned. When it is desired to stop the sprinkling of flour upon the parts referred to, then the operator simply moves the slide to carry its perforations out of register with the perforations in the bottom $S^2$.

When the machine is in operation and a lump of dough is placed in the hopper $H$, then said dough is taken hold of by the rollers $B'$ $B^2$, which form the dough into the sheet $C'$, passing over the table $K$ to and between the rollers $B^3$ $B^3$, which press the dough into a thinner but wider sheet, and this sheet is now rolled up into a spiral roll by the action of the toothed roller $D'$, the smooth roller $D^2$, and the table $D^3$, as previously described, the finished spiral roll finally rolling by its own weight over the apron or chute $E$ into the space between the shield $F^4$ and the covering $F^2$ to be worked and kneaded, as previously explained. The roll $C^3$, finally produced and discharged over the flange $F^6$ upon the chute $G$, is now in condition to be placed in a pan for baking purposes.

From the foregoing it is evident that a large number of lumps of dough can be successfully treated in the manner described and in a comparatively short time to allow of turning out a large amount of bread of a high quality in a comparatively short time.

Having thus fully described my invention, I claim as new and desire to secure by Letters Patent—

1. The improved dough-molding machine comprising devices which form dough into a sheet and roll the said sheet completely into a spiral form, and mechanism into which such spiral roll is dropped and by which it is kneaded to form a mass suitable for the oven, the two operations of spiral rolling and kneading being thus effected separately and sucessively, as and for the purpose specified.

2. In a dough-molding machine, the combination, with reducing-rolls, whereby dough is formed into a sheet, of a roller arranged in the path of the dough sheet as it leaves said rolls, and means for rotating it, its upper side thus moving in a direction opposed to the travel of the sheet, to form the latter into a spiral roll, and a guide-plate for delivering the sheet to such roller, substantially as shown and described.

3. A dough-molding machine comprising rollers for forming the dough into a sheet, means arranged below the rollers and fixed in position for rolling up the dough sheet spirally, and the dough-kneading apparatus having its mouth adjacent to and below the spiral roll-former, all substantially as shown and described.

4. A dough-molding machine having spaced sets of revoluble rollers, of which one roller of each set has annular flanges, the other roller of the set extending between said annular flanges, to form a passage between the rollers of a set, the passages for the sets of rollers being of different lengths, and means for adjusting the non-flanged rollers toward the flanged rollers to vary the distance between the rollers of a set, as set forth.

5. In a dough-molding machine, the combination with a toothed roller rotating in a direction opposite to the travel of the dough, a smooth roller arranged adjacent to and above said toothed roller and a fixed inclined guide arranged in the chute above the smooth roller, and having its lower end curved over and downward adjacent to the smooth roller, substantially as shown and described.

6. A dough-molding machine having a rolling-up device for rolling a dough sheet into a spiral roll, comprising a toothed roller and a smooth roller, the rollers rotating in opposite directions, as set forth.

7. A dough-molding machine having a rolling-up device for rolling a dough sheet into a spiral roll, comprising a toothed roller and a smooth roller, the rollers rotating in opposite directions, and a fixed apron or table extending to the top surface of the smooth roller and terminating a distance from one side of the toothed roller, as set forth.

8. A dough-molding machine having a rolling-up device for rolling a dough sheet into a spiral roll, comprising a pair of rollers of different size and rotating in opposite directions, the large roller forming a stop for the forward end of the dough sheet, and a fixed inclined guide for guiding the dough sheet over the smaller roller against the abutment or stop-roller, as set forth.

9. A dough-molding machine having a pressing and rolling device, comprising a revoluble drum or cylinder having a peripheral covering of a fabric material, a shield external to and spaced from the peripheral surface of said cylinder, for pressing and rolling a roll of dough, and means for adjusting the shield toward or from said cylinder, said means comprising levers for engaging the shield at or near the ends thereof, and a connection engaging the shield at or near the middle thereof and actuated from said levers, as set forth.

10. A dough-molding machine having a pressing and rolling device, comprising a revoluble drum or cylinder having a peripheral covering of a fabric material, a shield external to and spaced from the peripheral surface of said cylinder, for pressing and rolling a roll of dough, means for adjusting the shield toward or from said cylinder, said means comprising levers for engaging the shield at or near the ends thereof, a connection engaging the shield at or near the middle thereof and actuated from said levers, and means for simultaneously moving said levers, as set forth.

11. A dough-molding machine, provided with a drum or cylinder having flanges, auxiliary flanges adapted to fit against said drum or cylinder flanges at the inside thereof, and means for supporting said auxiliary flanges independent of the drum, as set forth.

In testimony whereof I have signed my name to this specification in the presence of two subscribing witnesses.

CHARLES A. THOMSON.

Witnesses:
   THEO. G. HOSTER,
   EVERARD B. MARSHALL.